（12） United States Patent
Kaliamoorthi et al.

(10) Patent No.: US 11,240,565 B2
(45) Date of Patent: Feb. 1, 2022

(54) METHOD AND APPARATUS FOR PERIPHERAL CONTEXT MANAGEMENT

(71) Applicant: NAGRAVISION S.A., Cheseaux-sur-Lausanne (CH)

(72) Inventors: Amudha Kaliamoorthi, Bangalore (IN); Prabhu Chawandi, Bangalore (IN); Karthikeyan Srinivasan, Bangalore (IN); Jihyun Park, Mountain View, CA (US); Jun Seo Lee, Eyunggi-do (KR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 17/022,256

(22) Filed: Sep. 16, 2020

(65) Prior Publication Data

US 2021/0144444 A1  May 13, 2021

Related U.S. Application Data

(63) Continuation of application No. 15/294,727, filed on Oct. 15, 2016, now abandoned.

(Continued)

(51) Int. Cl.
*H04N 21/482* (2011.01)
*G06F 3/0488* (2013.01)
(Continued)

(52) U.S. Cl.
CPC ....... *H04N 21/482* (2013.01); *G06F 3/04886* (2013.01); *H04N 21/2223* (2013.01);
(Continued)

(58) Field of Classification Search
CPC ......... H04N 21/4222; H04N 21/42219; H04N 21/42227; H04N 21/42228; H04N 21/482;
(Continued)

(56) References Cited

U.S. PATENT DOCUMENTS

| 5,596,647 A | * | 1/1997 | Wakai | H04H 20/62 348/E7.049 |
| 5,751,366 A | * | 5/1998 | Hobbs | H04N 7/04 348/479 |

(Continued)

FOREIGN PATENT DOCUMENTS

| CN | 110199331 | 3/2019 |
| EP | 2383984 A2 | 11/2011 |

(Continued)

OTHER PUBLICATIONS

International Application Serial No. PCT/US2018/013870, International Search Report and Written Opinion dated Jun. 6, 2018, 9 pages.

(Continued)

*Primary Examiner* — James R Sheleheda
*Assistant Examiner* — Timothy R Newlin
(74) *Attorney, Agent, or Firm* — Polsinelli LLP

(57) ABSTRACT

The present disclosure relates to a method and system for presenting a set of control functions via an interface of a peripheral control device (PCD). A control function can include a command associated with one or more media contexts of a host media device. The method decodes a payload, from the host media device, with an encoded context identifier, where the context identifier indicates a primary media context active on the host media device. The method determines one or more control functions corresponding to the context identifier, and changes the set of control functions on the interface of the PCD to include the one or more control functions that can command the primary media context.

20 Claims, 8 Drawing Sheets

Related U.S. Application Data

(60) Provisional application No. 62/274,095, filed on Dec. 31, 2015.

(51) Int. Cl.
*H04N 21/422* (2011.01)
*H04N 21/222* (2011.01)
*H04N 21/84* (2011.01)

(52) U.S. Cl.
CPC . *H04N 21/42203* (2013.01); *H04N 21/42204* (2013.01); *H04N 21/42224* (2013.01); *H04N 21/84* (2013.01); *H04N 21/42222* (2013.01); *H04N 21/42228* (2013.01)

(58) Field of Classification Search
CPC ....... H04N 21/42203; H04N 21/42204; H04N 21/84; G06F 3/04886
See application file for complete search history.

(56) References Cited

U.S. PATENT DOCUMENTS

| | | | |
|---|---|---|---|
| 5,760,698 A | 6/1998 | Iijima et al. | |
| 5,883,621 A | 3/1999 | Iwamura | |
| 6,038,452 A * | 3/2000 | Strawczynski | H04W 52/24 455/403 |
| 6,229,575 B1 * | 5/2001 | Vaughan | H04N 21/435 348/564 |
| 6,321,382 B1 | 11/2001 | Wugofski | |
| 6,346,934 B1 * | 2/2002 | Wugofski | H04N 21/42204 345/158 |
| 6,449,259 B1 * | 9/2002 | Allain | H04L 29/06 370/253 |
| 6,603,488 B2 | 8/2003 | Humpleman et al. | |
| 6,748,005 B1 * | 6/2004 | Riazi | H04B 7/2621 375/133 |
| 8,165,446 B2 * | 4/2012 | Bedingfield, Sr. | H04N 21/235 386/206 |
| 8,397,255 B2 | 3/2013 | Wachtfogel et al. | |
| 8,863,189 B2 * | 10/2014 | White | H04N 7/17318 725/46 |
| 9,313,258 B2 | 4/2016 | Stravinsky-Heilkron | |
| 9,819,985 B2 | 11/2017 | Stransky-Heilkron | |
| 2002/0059060 A1 * | 5/2002 | Park | G10L 19/005 704/201 |
| 2003/0162494 A1 * | 8/2003 | Oosugi | H04B 1/202 455/3.06 |
| 2005/0028208 A1 | 2/2005 | Ellis et al. | |
| 2005/0185069 A1 * | 8/2005 | Sim | A61K 31/375 348/239 |
| 2006/0195553 A1 | 8/2006 | Nakamura | |
| 2006/0288374 A1 * | 12/2006 | Ferris | H04N 21/25891 725/62 |
| 2008/0159715 A1 | 7/2008 | Fuasaro et al. | |
| 2008/0320539 A1 | 12/2008 | Ohkita | |
| 2009/0112589 A1 * | 4/2009 | Hiselius | H04M 3/56 704/246 |
| 2009/0138441 A1 | 5/2009 | Valentine | |
| 2009/0161027 A1 | 6/2009 | Hardacker et al. | |
| 2009/0284476 A1 * | 11/2009 | Bull | G06F 9/452 345/173 |
| 2010/0017736 A1 * | 1/2010 | Kim | H04N 21/42221 715/771 |
| 2010/0123613 A1 * | 5/2010 | Kohanek | H04N 21/42227 341/176 |
| 2010/0153885 A1 | 6/2010 | Yates | |
| 2010/0208146 A1 * | 8/2010 | Reams | H04N 21/41265 348/734 |
| 2010/0235781 A1 | 9/2010 | Friedlander et al. | |
| 2010/0241699 A1 * | 9/2010 | Muthukumarasamy | H04N 21/42209 709/203 |
| 2011/0074591 A1 * | 3/2011 | Arling | H04N 21/482 340/635 |
| 2011/0138334 A1 * | 6/2011 | Jung | G06Q 30/02 715/841 |
| 2011/0167447 A1 * | 7/2011 | Wong | H04N 21/6125 725/40 |
| 2011/0219420 A1 * | 9/2011 | Raveendran | H04N 21/4355 725/116 |
| 2011/0258660 A1 | 10/2011 | Thomas et al. | |
| 2012/0054794 A1 | 3/2012 | Kim et al. | |
| 2012/0256737 A1 * | 10/2012 | Park | H04N 21/47214 340/12.54 |
| 2012/0317085 A1 | 12/2012 | Green et al. | |
| 2013/0069769 A1 * | 3/2013 | Pennington | H04N 21/4126 340/12.28 |
| 2013/0113698 A1 * | 5/2013 | Kuroume | H04N 21/42208 345/156 |
| 2013/0152135 A1 | 6/2013 | Hong et al. | |
| 2013/0304794 A1 * | 11/2013 | Verma | G06F 3/038 709/201 |
| 2013/0312039 A1 | 11/2013 | Kuo | |
| 2013/0314598 A1 * | 11/2013 | Koizumi | H04N 21/42228 348/564 |
| 2014/0049467 A1 * | 2/2014 | Laligand | H04N 21/42228 345/157 |
| 2014/0053222 A1 | 2/2014 | Shoykher et al. | |
| 2014/0143336 A1 * | 5/2014 | Arunachalam | H04N 21/25891 709/204 |
| 2014/0152901 A1 * | 6/2014 | Narita | H04N 21/42222 348/734 |
| 2014/0168523 A1 * | 6/2014 | Kwak | H04N 21/42204 348/734 |
| 2014/0210693 A1 * | 7/2014 | Bhamidipati | H04N 21/43637 345/2.3 |
| 2014/0267933 A1 | 9/2014 | Young | |
| 2014/0304612 A1 | 10/2014 | Collin | |
| 2014/0351870 A1 | 11/2014 | Amine et al. | |
| 2015/0020098 A1 * | 1/2015 | Matsuda | H04N 21/47 725/37 |
| 2015/0040023 A1 | 2/2015 | Stransky-Heilkron | |
| 2015/0113567 A1 * | 4/2015 | Scheer | H04N 21/4524 725/46 |
| 2015/0172767 A1 * | 6/2015 | Park | H04N 21/44008 725/41 |
| 2016/0007083 A1 * | 1/2016 | Gurha | H04N 21/252 725/13 |
| 2016/0077901 A1 * | 3/2016 | Roth | H04L 67/42 719/328 |
| 2016/0182938 A1 * | 6/2016 | James | H04N 21/42203 704/275 |
| 2016/0255389 A1 | 9/2016 | Stransky-Heilkron | |
| 2016/0261903 A1 * | 9/2016 | Epstein | H04N 21/42221 |
| 2017/0195735 A1 | 7/2017 | Kakiamoorthi | |
| 2018/0203589 A1 | 7/2018 | Menand et al. | |

FOREIGN PATENT DOCUMENTS

| | | |
|---|---|---|
| EP | 2453667 A1 | 5/2012 |
| EP | 2667583 A2 | 11/2013 |
| WO | WO-2006134585 A1 | 12/2006 |
| WO | WO-2015015295 A1 | 2/2015 |
| WO | WO-2018136418 A1 | 7/2019 |

OTHER PUBLICATIONS

Extended European Search Report for related EP Patent Application No. 16207105.4, dated May 9, 2017, 9 pages.

Non-Final Office Action dated Sep. 21, 2017 for U.S. Appl. No. 15/294,727, 11 pages.

Final Office Action dated May 17, 2018 for U.S. Appl. No. 15/294,727, 9 pages.

Non-Final Office Action dated Nov. 2, 2018 for U.S. Appl. No. 15/294,727, 8 pages.

Final Office Action dated May 13, 2019 for U.S. Appl. No. 15/294,727, 9 pages.

(56) References Cited

OTHER PUBLICATIONS

Non-Final Office Action dated Sep. 20, 2019 for U.S. Appl. No. 15/294,727, 10 pages.
Final Office Action dated Mar. 16, 2020 for U.S. Appl. No. 15/294,727, 9 pages.
Notice of Allowance dated Jun. 25, 2020 for U.S. Appl. No. 15/294,727, 6 pages.

\* cited by examiner

METHOD AND APPARATUS FOR PERIPHERAL CONTEXT MANAGEMENT

RELATED APPLICATION

This application is a continuation of U.S. patent application Ser. No. 15/294,727, filed Oct. 15, 2016, which claims the benefit of U.S. Provisional Application No. 62/274,095, filed Dec. 31, 2015, both of which are incorporated herein by reference in their entirety for all purpose.

FIELD OF THE INVENTION

The present disclosure relates generally to peripheral management and more particularly to peripheral context control with a host device.

BACKGROUND

Traditional televisions (TV) and set-top box (STB) consumer devices have static remote controls used for navigation purposes. In the TV domain, conventional remote controls have a set of mechanical keys which are mapped to a set of functionality. Remote control units have increased in compatibility to operate various devices, such as, a main display of the TV, projectors, sound systems, gaming systems, media players, STBs, etc. but involve a high degree of user input to match the active device or interface screen with the available operations for user control. Traditionally, the user discovers the proper configuration through trial and error.

Some remote controls have displays and can change between a set of keys or options but do not provide clarity on what set of keys or options can be used for different usage cases. For example, a remote controls may have 20 set of keys available for a STB offering live broadcast TV, menu access, video on-demand, games, etc., but as the STB changes screens or menus, the display of the remote controls remains static with control option irrelevant to the updated screens or menus in use on the STB.

Additionally, when software on STBs is updated to include new features, menus, or operations, the options available to users on the remote controls are restricted to previously mapped functionality. For example, when a feature to "play the next episode" is added to a menu or screen, the traditional remote controls is restricted to previously mapped arrow navigation that can involve several user interactions to perform. Traditional remote controls do not support updatable options for display by the remote controls and fail to provide a positive user experience.

BRIEF DESCRIPTION OF THE DRAWINGS

The present disclosure is illustrated by way of examples, and not by way of limitation, and may be more fully understood with references to the following detailed description when considered in connection with the FIGs., in which.

DETAILED DESCRIPTION

Figure 1:
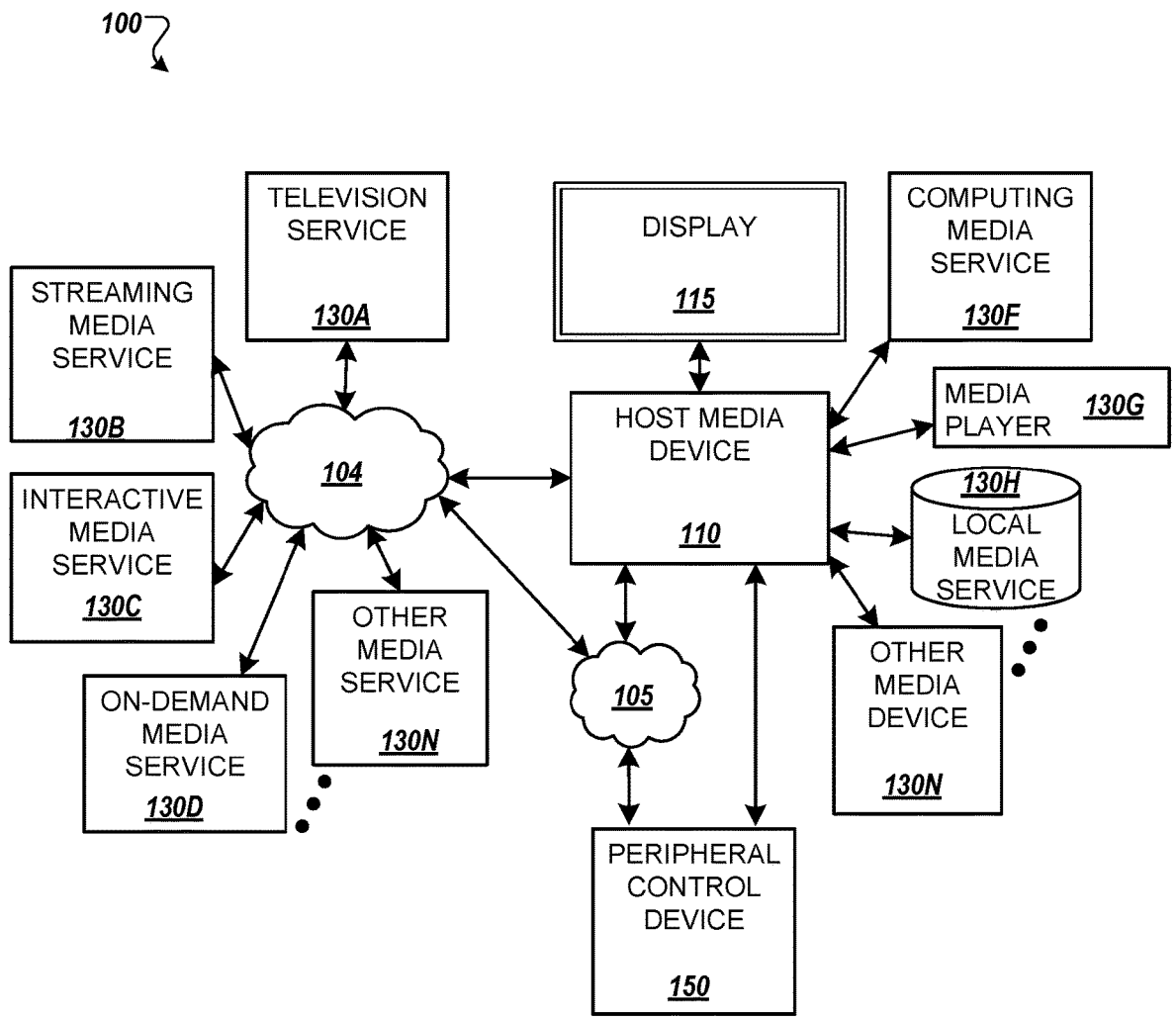
FIG. 1 illustrates a block diagram of an example system in accordance with one or more implementations of the present disclosure.

The present disclosure relates to techniques for coordinating control functions between a host media device and a peripheral control device (PCD). The host media device (e.g., a set-top-box (STB), Television (TV), etc.) can connect to several different media services (e.g., a broadcast media service, a streaming media service, an on-demand media service, etc.). A context may refer to an application or graphical user interface currently running on a host media device that is presented on a main display (e.g., TV, monitor, projector, etc.).

Different types of media services may have a different group of control functions (e.g., new channel, play, pause, new episode, etc.) to control items of content displayed by the host media device. Additionally, media services are increasingly offering users additional custom options to interact with the media service. As the variety of media services grows, the number and combination of control functions are difficult to manage using traditional remote controls. For example, a traditional remote control device stays configured with control functions corresponding to a live broadcast media service when a host TV changes to running a streaming service. Moreover, as on-screen menus and graphical user interfaces become more complicated, users navigation is becoming increasingly more laborious and complicated. Accordingly, peripheral devices with increased context control and management allow the user to maintain control of the host device switching between multiple media services across various contexts and sub-contexts.

The techniques described here relate to switching context controls on a peripheral control device to enable users to efficiently access and control a variety of media service. As used herein, the term media services may at least include traditional media services, as well as, local media types (e.g., video files, music files, and digital images). In an example aspect of the present disclosure, software on the peripheral control device allows reception and storage of sets of control functions associated with media applications of the host media device. The host media device can identify different contexts active on the main display and transmit a context identifier to indicate to the peripheral control device to load one or more sets of control.

In an example aspect of the present disclosure, a method is provided to present a set of control functions via an interface of a PCD. A control function is a command associated with one or more media contexts. The method includes decoding a payload from the host media device with an encoded context identifier. The context identifier indicates a primary media context active on the host media device that allows the PCD to determine one or more control functions corresponding to the context identifier. The set of control functions on the interface of the PCD change to include the one or more control functions to command the primary media context. For example, when the media service displaying on a TV changes from a live broadcast to a streaming media service, the control functions displayed on the PCD change to include playback options as well as application specific shortcuts that allow for efficient control of the media service.

In an example aspect of the present disclosure, the host media device can communicate using encoded payloads that allows the PCD to receive additional control information to present control functions relevant to the media service running on the host media device. For example, the PCD can receive a network logo that matches the channel being displayed by the host media device. In an implementation, encoded payloads can be transmitted using a standard report protocol, as discussed herein.

FIG. 1 illustrates a block diagram of an example system 100 in accordance with one or more implementations of the present disclosure. System 100 may be configured to enable a peripheral control device 150 to switch control contexts in accordance with the techniques described herein. In the example illustrated in FIG. 1, system 100 includes one or more communications networks 104-105, a host media device 110, a main display 115, one or more media services 130A-130N, and a peripheral control device 150. System 100 may include software modules operating on one or more devices. Software modules may be stored in a memory and executed a processor. Devices (e.g., the host media device 110, the peripheral control device 150) may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include optical discs, including, e.g., Blu-ray discs, DVDs, and CD-ROMs, flash memory, or any other suitable digital storage media.

System 100 represents an example of a system that may be configured to allow the host media device 110 to access multiple media services 130A-130N for presentation of media content to a user, for example, via the display 115. In the example illustrated in FIG. 1, the host media device 110 may include any device configured to transmit data to and/or receive data from communication network 104. For example, the host media device 110 may be equipped for wired and/or wireless communications and may include set-top boxes, digital video recorders, televisions, desktop, laptop, or tablet computers, gaming consoles, mobile devices, including, for example, "smart" phones, cellular telephones, and personal gaming devices.

Communications networks 104-105 may comprise any combination of wireless and/or wired communication media. Communications networks 104-105 may include coaxial cables, fiber optic cables, twisted pair cables, or any other equipment that may be useful to facilitate communications between various devices and sites. Communications network 104 can represent a wide area network that allows the host media device to connect to one or more media services 130A-130N.

Media services 130A-130N may provide content to the host media device 110 using communications network 104 (e.g., broadcast, Internet protocol, etc.). For example, television service 130A may include a public over-the-air television broadcast, a cable television service, satellite television service, etc. that is configured to provide television services to analog and/or digital televisions and set-top boxes. In some examples, the media services 130A-130N may be referred to as a television service 130A, a streaming media service 130B, an interactive media service 130C, an on-demand media service 130D, a computing media service 130F, or other media service 130N. For example, a user of one of the host media devices 110 may access the Internet and multimedia content provided by a media service 130A-130N through a cable modem connected to a coaxial network maintained by a cable television provider.

The host media device 110 may also be configured to access media services 130A-130N independent of a communications network 104. For example, the host media device 110 can directly access a library of multimedia (e.g., music, movies, and TV shows) stored in local media service 130H, a media player 130G, a computer media service 130F, or other media device 130N. Further, in some examples, media services 130A-130N may refer to applications that, upon execution, enable a user to access digital content through execution of the application.

In addition to being configured to receive digital media content from communications network 104, the host media device 110 is configured to communicate with peripheral control device 150 either directly or through communications network 105. Communications network 105 can represent a local area network or local wireless communication means. using a standardized communication protocol, such as for example, Universal Serial Bus protocol (USB), Bluetooth, ZigBee or a proprietary communications protocol, such as, for example, a proprietary infrared communications protocol.

The peripheral control device 150 is a device configured to communicate with the host media device 110 and includes a user interface (e.g., a touch screen, microphone, etc.) in communication with a device with digital media presentation capabilities (e.g., host media device 110). The peripheral control device 150 may be an associated companion device, including, for example, remote controllers, human interface devices, tablet computers, etc. In an example, peripheral control device 150 may execute applications in conjunction with the host media device 110. As described in reference to FIGS. 3-6, peripheral control device 150 may be configured to provide user interfaces that enable users to provide input. For example, upon selection through a user interface of the peripheral control device 150, an item of content may be presented on a display 115 of the host media device 110.

The peripheral control device 150 includes an interface (e.g., a touchscreen) that changes the control commands presented to the user based on the media service or type of media running (i.e., rendering, displaying, etc.) on the host media device 110. When the host media device 110 changes the media service 130A-130N being displayed on display 115, the peripheral control device 150 can update the interface to include control options that correspond to relevant control commands of the media service 130A-130N. For example, if the host media device 110 switches from a television media service 130A to an on-demand media service 130D, the peripheral control device 150 can adapt the commands present on the interface to replace channel navigation command options with on-demand menu navigation command options.

Peripheral control device 150 may be equipped for wired and/or wireless communications. In the example illustrated in FIG. 1, peripheral control device 150 may be configured to communicate directly with the host media device 110 (e.g., using a short range or near field communication protocols), communicate with the host media device 110 via a local area network 105 (e.g., through a Wi-Fi router), and/or communicate with a wide area network (e.g., a cellular network) 104. Further, in some examples, peripheral control device 150 may act as a client device for the host media device 110. For example, peripheral control device 150 may be configured to act as a Universal Plug and Play (UPnP) client or a multicast Domain Name System (mDNS) client. In one example, peripheral control device 150 may be registered with the host media device 110 using its media access control (MAC) address or a unique device identifier and/or a user's subscriber identifier.

In an implementation, wireless communication between the host media device 110 and peripheral control device 150 via network 105 uses Bluetooth Low Energy to provide reduced power consumption and cost. Human Interface Devices (HID) (e.g., peripheral control device 150) implement wireless transmission of data according to the Bluetooth Low Energy protocol. The Bluetooth Low Energy wireless protocol is compatible with Human-Interface-Devices (HIDs) using the Bluetooth Generic Attribute profile (GATT). A Generic ATTribute Profile is associated with an Attribute Protocol (ATT) that establishes common operations and a framework for the data transported and stored by the Attribute Protocol. The HID over GATT profile defines the procedures and features to be used by Bluetooth Low Energy HID Devices using GATT and Bluetooth HID Hosts using GATT.

Once a connection is established between the host media device 110 and the peripheral control device 150, the HID over GATT profile specifies formats for data transfers referred to as reports. In some cases, reports can be in arbitrary formats and parsed by devices while other reports are specified to of a predefined length and format. A feature report can be sent by either device to establish a connection. An input report can refer to a predefined report format sent by the peripheral control device 150 and received by the host media device 110. An output report can refer to a predefined report format sent by the host media device 110 to peripheral control device 150.

Figure 2:
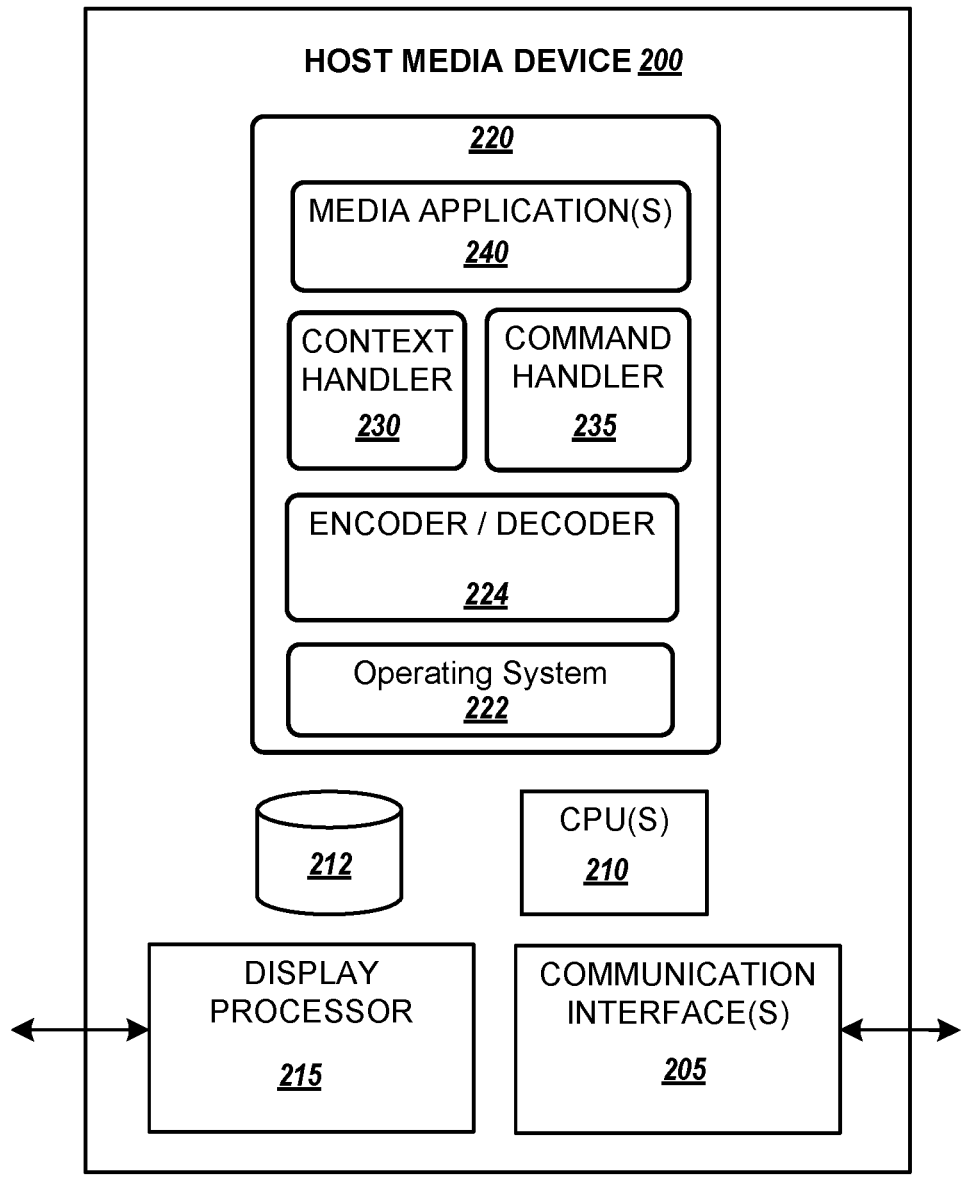
FIG. 2 illustrates an example of a host media device in accordance with one or more implementations of the present disclosure.
Figure 3:
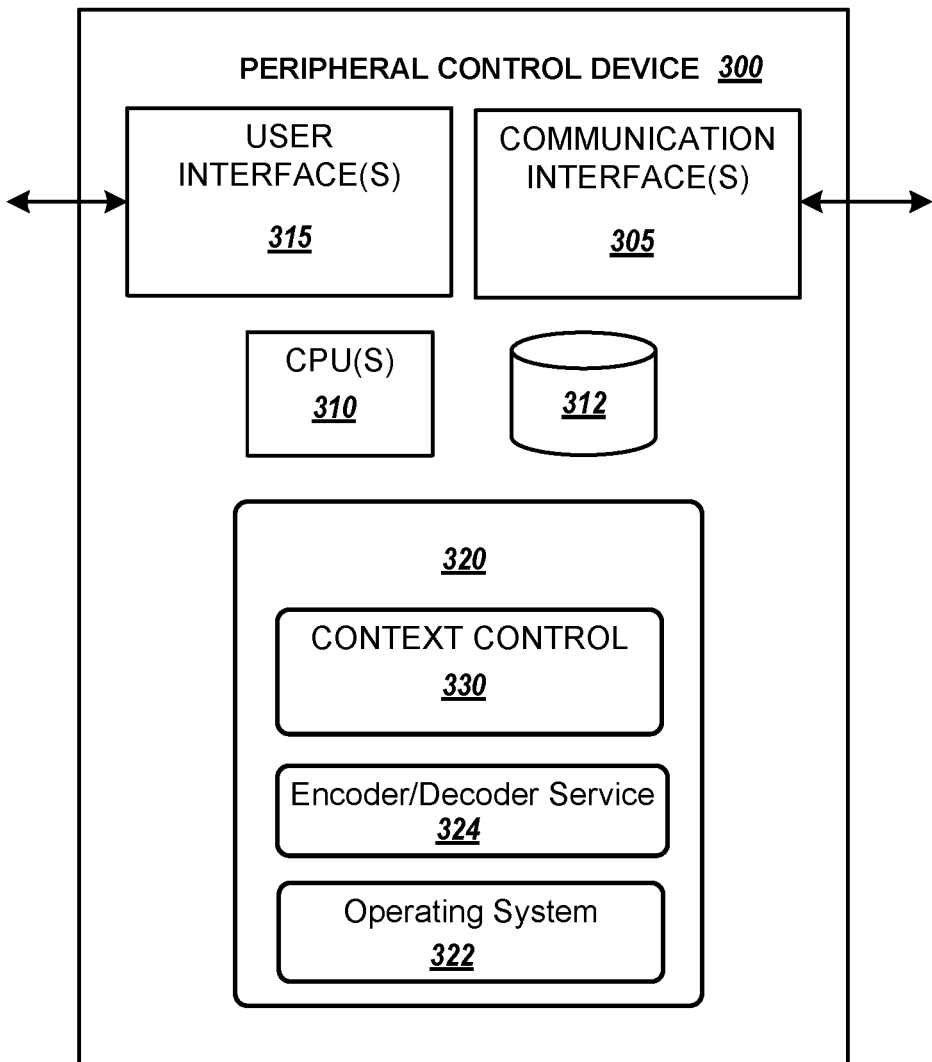
FIG. 3 illustrates an example peripheral control device in accordance with one or more implementations of the present disclosure.
Figure 4:
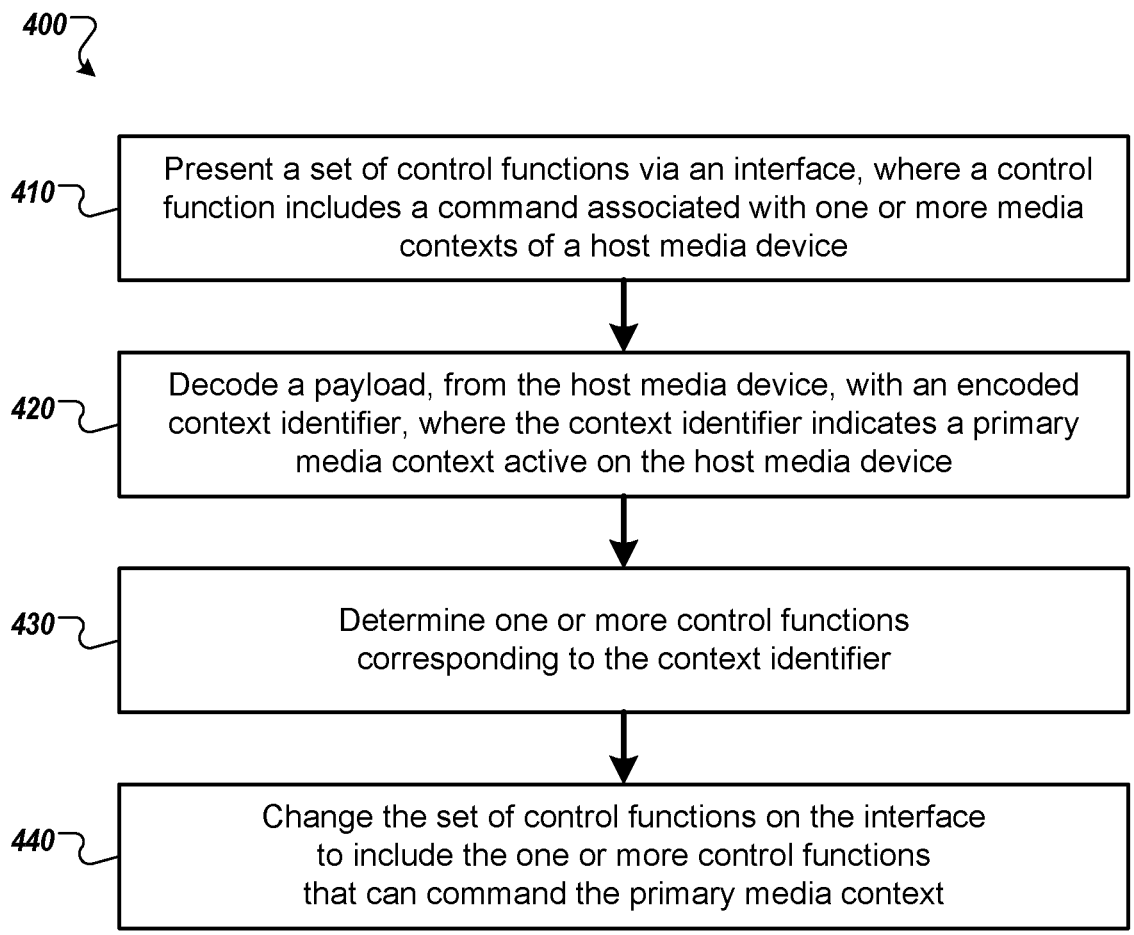
FIG. 4 is a flow diagram of an example context management method in accordance with one or more implementations of the present disclosure.

As described in reference to FIG. 2-4, the HID over GATT profile can be used to transmit HID reports that can be encoded with a context identifier to indicate to the peripheral control device to load one or more sets of control. As described in reference to FIG. 4-7, in some implementation, the host media device 110 can use HID reports to transfer images to the peripheral control device 150. As described in reference to FIG. 4-7, in some implementation, peripheral control device 150 can use HID reports to wirelessly transfer voice commands to host media device 110.

In an implementation of the present disclosure, a HID over GATT (HoG) profile is used for transfer of image. As per the HID specification, the host media device can receive data via the input report format, send data via the output report format, and communicate features via a feature report format. Two of the three supported report types (the input reports and the output report) can be used to transfer data. In an implementation of the present disclosure the output report is used to transfers data associated with control functions to be presented by the PCD 150. Output reports can be sent in bulk and in short messages.

According to an exemplary aspect, image data can be encoded in the supported format of the host media device 110 and decoded by a decoder of the PCD 150. Encoded data can be sent as part of a set of packets, which are received (e.g., directly or indirectly) by the PCD 150. The peripheral control device 150 can store the encoded data to assemble the image data. The encoded data can be decoded to get the actual image transferred. Since the image data is transmitted as notifications, there transfer can be completed independent of handshaking that indicate a start and stop. The packets are tailored with header and trailer information to indicate a start and stop of the image data. For example, channel logos are transferred over Bluetooth Low Energy from the host media device 110 to the PCD 150. The method can also be implemented using HID specification with ZigBee communication.

FIG. 2 illustrates an example of a host media device 200 in accordance with one or more implementations of the present disclosure. Host media device 200 is an example of a computing device (e.g., host media device 110 of FIG. 1) that may be configured to transmit data to and receive data from a communications network, connect to multiple media services, allow a user to access multimedia content, and execute one or more applications. Host media device 200 may include or be part of a stationary computing device (e.g., a desktop computer, a television, a set-top box, a gaming console, a dedicated multimedia streaming device, a digital video recorder, etc.), a portable computing device (e.g., a mobile phone, a laptop, a personal data assistant (PDA), a tablet device, a portable gaming device, etc.) or another type of computing device. In an example, the host media device 200 can include, but not limited to, one or more communication interface(s) 205, central processing unit(s) 210, memory 212, and a display processor(s) 215 for presenting media content via a main display.

Central processing unit (CPU) 210 may be configured to implement functionality and/or process instructions for execution in the host media device 200. CPU 210 may be capable of retrieving and processing instructions, code, and/or data structures for implementing one or more of the techniques described herein. Instructions may be stored on a computer readable medium, such as memory 212. CPU 210 may include multi-core central processing units.

The CPU 210, the communication interface(s) 205, memory 212 and, display processor 215 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. Functions of host media device 200 may be realized using any combination of hardware, firmware and/or software implementations. In some examples, functionality of host media device 200 may be implemented using one or more so-called systems on a chip (SOC). The host media device 200 may be configured to enable communications between components and comprises structures that enable data to be transferred from one peer device to another peer device or to a storage medium. For example, host media device 200 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices.

The communication interface(s) 205 may be configured to enable host media device 200 to send and receive data via networks as well as direct communications means for transfer of data with local devices. For example, communication interface(s) 205 may be configured to send and receive digital content originating from one or more media services, such as, a broadcast, a multicast, a unicast, an over-the-top content source, a personal video recorder (PVR), and a peer-to-peer content source, etc. Data sent or received may include data from a media service associated digital content, such as, for example, music, videos, images, webpages, messages, voice communications, and applications.

Communication interface(s) 205 may include a network interface card, such as an Ethernet card, an optical transceiver, a radio frequency transceiver, or any other type of device configured to send and receive information. The communication interface(s) 205 may be configured to communicate with a with a peripheral control device (e.g., peripheral control device 150 of FIG. 1) and operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, Bluetooth, ZigBee, and/or an IEEE standard, such as, one or more of the 802.11 standards, as well as various combinations thereof. Data sent or received may include encoded packets with control commands for operation of one or more media services.

Communication interface(s) 205 may be configured to perform physical signaling, addressing, and channel access control according to the physical and network layers to extract audio packets, video packets, and data packets from a data stream, or similar fragments and utilize a network, such as, for example, network 104. For example, communication interface(s) 205 may be configured to extract video packets, audio packets, and data packets according to one or more streaming protocols including internet protocol (IP), transport control protocol (TCP), real time streaming protocol (RTSP), user datagram protocol (UDP), real time protocol (RTP), MPEG transport streaming protocols, IPTV protocols, and the so-called HTTP Live Stream (HLS) Protocol.

Data associated with digital content can refer to, for example, music, videos, images, webpages, messages, voice communications, and applications that may be stored in a computer readable medium, such as, for example, memory 212. Data stored in a memory device may be retrieved and processed by the CPU 210 along with audio decoders, audio processors, video decoders, graphics processing units, and the display processor 232.

Display processor 215 may be configured to retrieve and process data for display. For example, display processor 215 may be coupled to a main display (e.g, display 115 of FIG. 1) using a standardized communication protocol (e.g., High-Definition Multimedia Interface (HDMI), Digital Visual Interface (DVI), DisplayPort, component video, composite video, and/or Video Graphics Array (VGA)). The display (e.g., display 115) may by any means to present digital content, such as a liquid crystal display (LCD), a plasma display, an organic light emitting diode (OLED) display, a standard definition television, a high definition television, an ultra-resolution display, an integrated display of a portable computing device (e.g., a mobile phone, a laptop, a personal data assistant (PDA), or a tablet device), or another type of display device capable of presenting video data to a user.

Memory 212 may be described as a non-transitory or tangible computer-readable storage medium. In some examples, memory 212 may provide temporary and/or long-term storage and be represent volatile and/or non-volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. Memory 212 may include an internal hard disk or solid state drive, a random access memory module, an embedded MultiMediaCard (eMMC) memory device, and/or one or more caches (e.g., CPU caches and/or GPU caches).

Memory 212 may be configured to store information that may be used by host media device 200 during operation. Memory 212 may be used to store program instructions for execution by CPU 210 and may be used by software or applications 220 running on host media device 200 to temporarily store information during program execution. For example, memory 212 may store instructions associated with operating system 222, drivers, encoder/decoders applications 224, a context handler 230, a command handler 235, and media application(s) 240.

Applications 220 may include applications implemented within or executed by host media device 200 and may be implemented or contained within, operable by, executed by, and/or be operatively/communicatively coupled to components of host media device 200. Applications 220 may include and be executed by operating system 222. Operating system 222 may be configured to facilitate the interaction of applications (e.g., encoder/decoders applications 224, context handler 230, command handler 235, media application(s) 240, etc.) with CPU 210, and other hardware components of host media device 200. Operating system 222 can include a HID driver and driver management software to support the Bluetooth Low Energy protocol. Components of operating system 220 and components acting in conjunction with operating system 222 may be referred to as middleware. Further, in some examples, application 220 may include an application programming interface (API). The techniques described herein may be utilized by devices configured to operate using any and all combinations of software architectures. Operating system 222 may be an operating system designed to be installed on laptops, desktops, smartphones, tablets, set-top boxes, digital video recorders, televisions and/or gaming devices. In one example, operating system 222 may include one or more of operating systems or middleware components developed by OpenTV®, Windows® operating systems, Linux operation systems, Mac OS®, Android® operating systems, and any and all combinations thereof.

Applications 220 may cause one or more graphical user interfaces to be presented that enable a user to provide data (i.e., commands) for use by a media application 240. Applications 220 for enabling a user to access a digital media service may be highly integrated with an application or operating system 222 of the host device 200. For example, a set-top box supported by a cable television provider may enable a user to access items of content from a television service, an on demand media service maintained by the cable television service provider, and/or a third party media streaming service. Each distinct graphical user interface enabling a user to select items of content to access may be referred to as a context.

Media application(s) 240 may be provided to the host media device 200 and enable the presentation of different graphical user interfaces associated with items of content (i.e. different contexts). Each media application(s) 240 and/or distinct graphical user interface may have different control commands that enable a user to select items of content or control operations and features provided by the media application(s) 240. For example, a media application 240 of on-demand content can include a command that allows a user to skip recorded commercials.

Context handler 230 and command handler 235 may operate in conjunction with an application running on a peripheral control device, as described in reference to FIGS. 3-4. Command handler 235 can register application specific commands, shortcuts, virtual button icons, etc. from media applications 240 to create command profiles associated with media applications 240 that can be stored in a memory (e.g., memory 212). A command profile can include mapped control functions associated with a context of a media application 240. The command handler 235 can associate application specific icons with the mapped control functions for display by the peripheral control device. The command handler 235 can transmit command profiles as control options to be stored by the peripheral control device. As discussed in reference to FIGS. 3-5, the peripheral control device can receive control options as mapped control functions to virtual buttons for display by the peripheral control device. In some implementations, the command handler 235 can track and manage the command profiles stored by the peripheral control device. In some implementations, the peripheral control device can notify or request the command handler 235 to provide control options associated with a command profile. For example, the peripheral control device may only store a subset of available control functions and the command handler 235 can provide control functions not available in storage of the peripheral control device.

The context handler 230 can identify the media application 240 currently running on the host media device 200. For example, context handler 230 identifies when the host media device 200 changes between a media application 240 associated with a media service for broadcast television, gaming application, a streaming media service, etc. In some implementations, the context handler also identifies a sub-context for a particular aspect of the media application 240 running on the host media device. A sub-context may refer to a specific graphical user interface (e.g., a navigation menu, item of content, commercial, etc.) of the media application 240 that is associated with one or more specific control functions. In an implementation, the context handler 230 assigns one or more context identifiers to a media application 240 and associates the relevant command profiles. Application specific icons and mapped control functions may be based on a context and/or a sub-context. In response to determining the active context of the media application 240 for a context identifier, the context handler 230 can notify the peripheral control device, via an encoded payload, to coordinate display of command options on the peripheral control device. As described in reference to FIGS. 3-5, commands for controlling various media services can be associated with a context identifier that is communicated to a peripheral control device. The peripheral control device can load control functions that are relevant to a selected media service or content being displayed via the host media device 200 based on the context identifier.

Encoder/Decoder 224 can be used with the one or more communication interfaces 205 to communicate with the peripheral control device using one or more wireless protocols. In an implementation, communication interface is configured for Bluetooth® Low Energy communication with the peripheral control device. Encoder/Decoder 224 is used to communicate data to and from the context handler 230, the command handler 235, or the media applications 240 with the peripheral control device utilizing one or more efficient protocols.

Encoder/Decoder 224 can send data transported over the Attribute Protocol and can accept Attribute Protocol requests, commands, and confirmations from a GATT client such as the peripheral control device. Attributes are generally formatted as services and characteristics. Services may include a collection of characteristics that include a value and a number of descriptors describing the characteristic value. The GATT Profile can describe a structure in which profile data is exchanged. A structure may describe basic elements (e.g., services and characteristics) used in a profile. A top level of the hierarchy is a profile. A profile may include one or more services necessary to fulfill a use case. For example, a service may include characteristics or references to other services. In some implementations, characteristic include a value and may contain optional information about the value. The service and characteristic and the components of the characteristic (e.g., value and descriptors) may include the profile data. The GATT profile makes use of characteristic descriptors and associated values that can be understood by compatible HID devices.

The host media device 200 can receive, via communication interface 205, and decode, via Encoder/Decoder 224, input reports of the HID over GATT protocol sent by a peripheral control device. The host media device 200 can also use Encoder/Decoder 224 to generate and encode output reports for transmission to the peripheral control device via communication interface 205. In some implementations, the Encoder/Decoder 224 sends indication and notifications (e.g., asynchronously) to the peripheral control device when specified events occur. For example, context handler 230 can detect a context of the main display changed, determine a context identifier associated with the new context, and Encoder/Decoder 224 send an encoded payload encoded with the context identifier to the peripheral control device.

Image data and audio data can be encoded with header and trailer information. Encoded data is transferred to peripheral device via HID output reports. The peripheral control device decodes the header and stores or buffering the data until trailer information is received. The peripheral control device decodes the data based on the encoding done. The encoding and decoding of transferred data can be done in parallel. In an implementation a channel logo can be transferred from the host media device to the peripheral control device. The peripheral control device may include an interactive display of the received images that allows a user to command the host media device.

In some implementations, the host media device 200 can transmit or receive additional data encoded as an HID report. Encoder/Decoder 224 can include functionality to transform the additional data into a format for transfer as an HID report. For example, the host media device 200 can include a command handler 235 for processing voice commands. For example, the Encoder/Decoder 224 can decode an input report and parse header and trailer information to extract voice data from an input report for processing by the command handler 235. In another example, the Encoder/Decoder 224 can encode image data into a compressed format and append header and trailer information to transmit the image data as a HID output report to a peripheral control device. As discussed in reference to FIGS. 4-7, the host media device 200 can use the HID reports to transfer and receive payloads encoded with addition data, such as voice commands or image data.

Figure 5A:
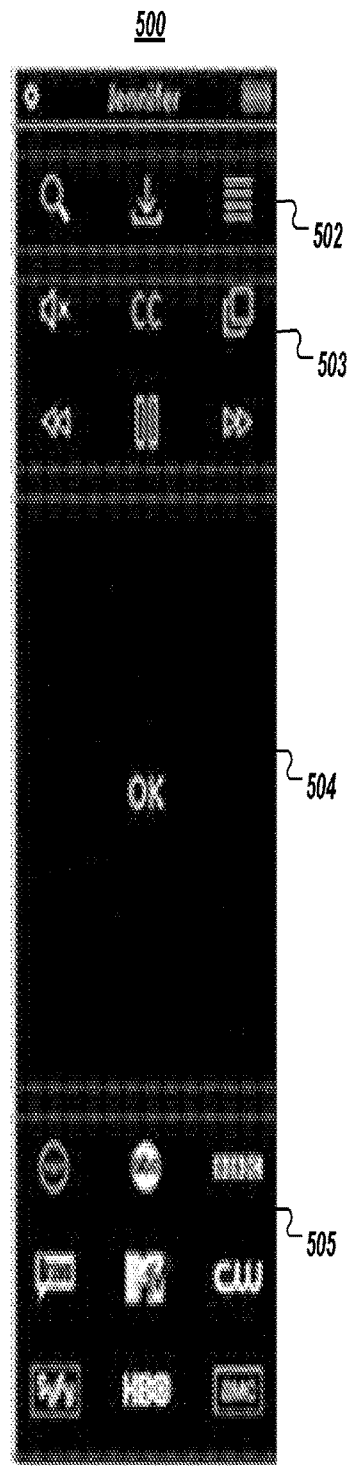
FIGS. 5A-B illustrates example interfaces of a peripheral control device in accordance with one or more implementations of the present disclosure.
Figure 5B:
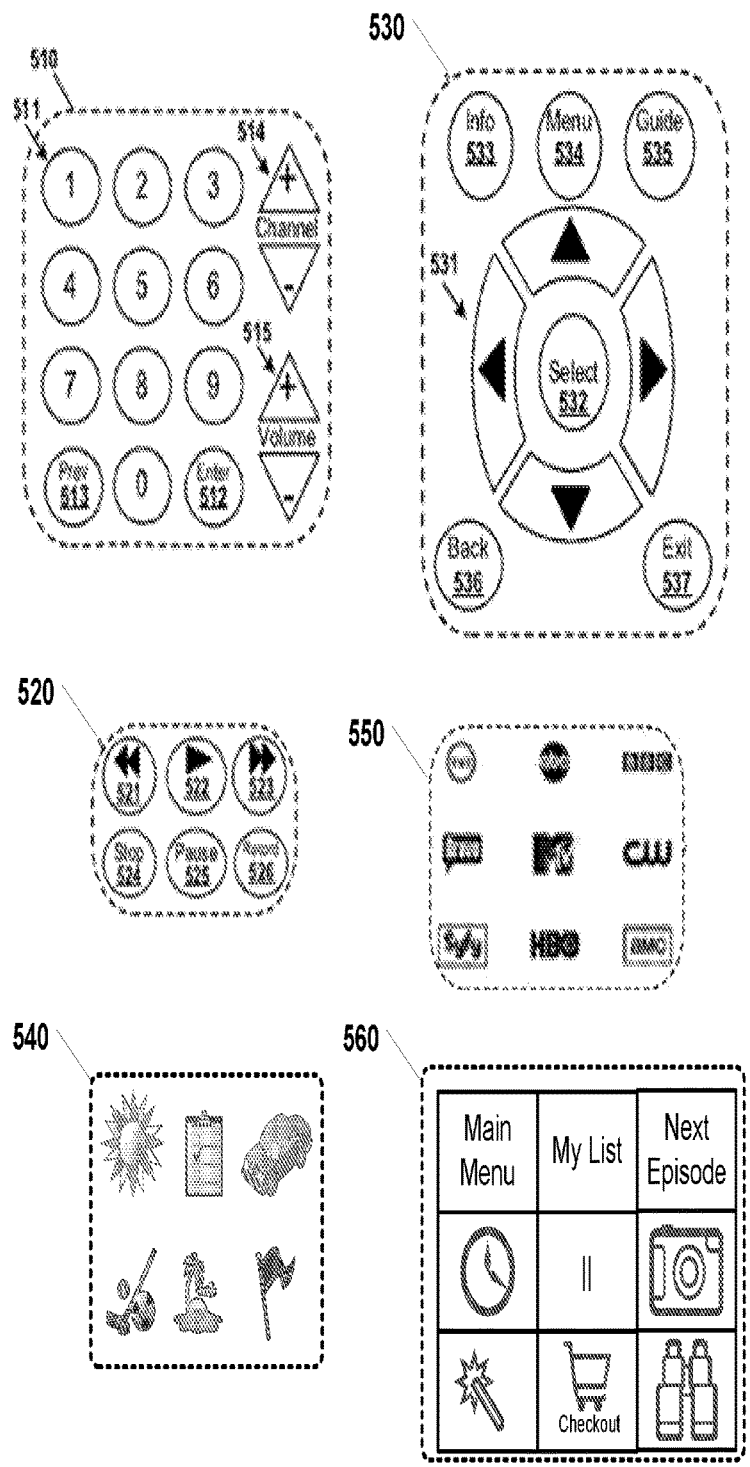
Figure 6:
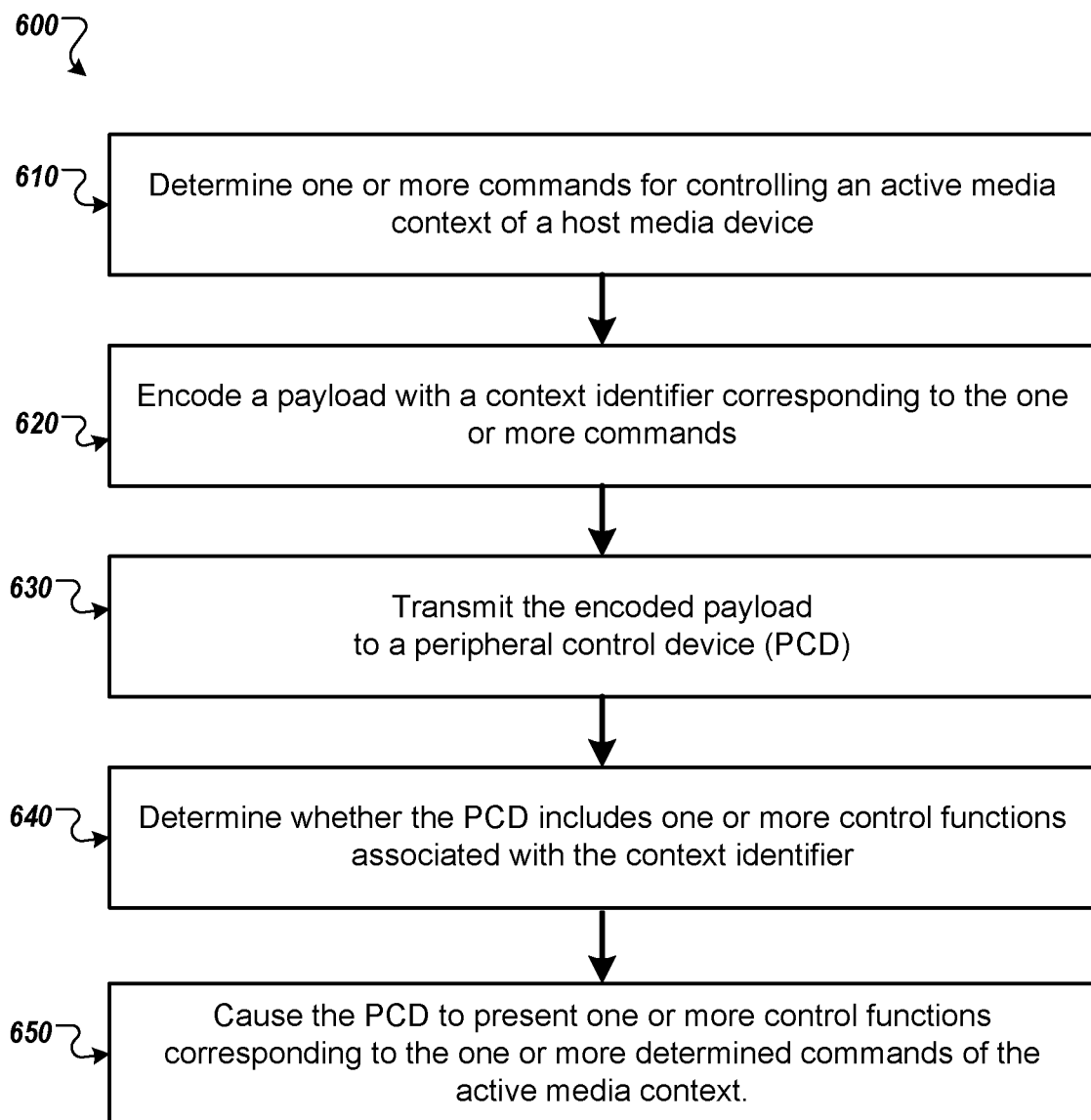
FIG. 6 is a flow diagram of an example context management method in accordance with one or more implementations of the present disclosure.

In an implementation, as described in reference to FIG. 4-6, the Encoder/Decoder 224 can encode a payload with an image encoded in a Bluetooth® Low Energy protocol. The payload can cause the peripheral control device to present the image as a control function associated with a context that matches a media service being rendered by a display associated with the host media device 200. In an implementation, the payload can include audio data encoded in a Bluetooth® Low Energy, where the audio data is used by the peripheral control device as a control function associated with a context that matches a media service being rendered by a display associated with the host media device 200.

FIG. 3 illustrates an example peripheral control device 300 in accordance with one or more implementations of the present disclosure. Peripheral control device 300 is an example of a computing device (e.g., peripheral control device 150 of FIG. 1) that may be configured to transmit control commands and receive data from a host media device (e.g., host media device 110 of FIG. 1, host media device 200 of FIG. 23). Peripheral control device 300 allow a user to access multiple sets of control functions associated with multimedia content presented on a display associated with the host media device.

Peripheral control device 300 can be resource constrained devices that can connect to a more powerful (e.g., more resources, bandwidth, etc.) host media device and execute one or more applications. In an example, the peripheral control device 300 can include, but not limited to, one or more communication interface(s) 305, central processing unit(s) 310, memory 312, user interface(s) 315 for presenting control functions to a user.

Central processing unit (CPU) 310 may be configured to implement functionality and/or process instructions for execution in the peripheral control device 300. CPU 310 may be capable of retrieving and processing instructions, code, and/or data structures for implementing one or more of the techniques described herein. Instructions may be stored on a computer readable medium, such as memory 312. CPU 310 may include multi-core central processing units.

Communication interface(s) 305 may include a network interface card, such as an Ethernet card, an optical transceiver, a radio frequency transceiver, or any other type of device configured to send and receive information. The communication interface(s) 305 may be configured to communicate with a with the host media device and operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, Bluetooth, ZigBee, and/or an IEEE standard, such as, one or more of the 802.11 standards, as well as various combinations thereof. Data sent or received may include encoded packets with control commands for operation of one or more media services.

Memory 312 may be a non-transitory or tangible computer-readable storage medium. In some examples, memory 312 may provide temporary and/or long-term storage and be represent volatile and/or non-volatile memory. Memory 312 may include an internal hard disk or solid state drive, a random access memory module, an embedded MultiMedia-Card (eMMC) memory device, and/or one or more caches (e.g., CPU caches and/or GPU caches).

Memory 312 may be configured to store information that may be used by peripheral control device 300 during operation. Memory 312 may be used to store program instructions for execution by CPU 310 and may be used by software or applications 320 running on the peripheral control device 300 to temporarily store information during program execution. For example, memory 312 may store instructions associated with operating system 322, Encoder/Decoders applications 324, a context control 330 application.

Applications 320 can be used collecting and transmitting user input to the host media device to cause control of digital content executed by the host media device 200. Applications 320 may include applications implemented within or executed by peripheral control device 300 and may be implemented or contained within, operable by, executed by, and/or be operatively/communicatively coupled to components of peripheral control device 300. In an example, applications 320 may cause peripheral control device 300 to receive and decode updated control functions, present control options to a user that are relevant to an active media application on a main display, collect user input, encode the user input or selected control functions for transmission to the host media device. The applications 320 include a HID driver and driver management software to process wireless communication the host media device 200.

Applications 320 may include and be executed by operating system 322. Operating system 322 may be configured to facilitate the interaction of applications (e.g., Encoder/Decoders applications 324, context control 330) with CPU 310, and other hardware components of peripheral control device 300. Components of operating system 322 and components acting in conjunction with operating system 322 may be resource constrained.

A context control 330 application running on the peripheral control device 300 may be configured to receive data (e.g., a context identifier) from the host media device 200 and receive a context identifier used to load a set of control functions that match a context and/or a sub-context of the host media device 200. Context control 330 may cause one or more user interfaces 315 to present a set of control functions that match the context of the host media device to allow for efficient control of one or more media services.

User interface(s) 315 may include devices configured to receive input from a user during operation of peripheral control device 300. For example, user interface(s) 315 may include buttons and switches, motion sensors (e.g., accelerometers), touch-sensitive sensors, a track pad, a mouse, a keyboard, a microphone, a video camera, or any other type of device configured to receive user input.

In some examples, an peripheral control device 300 including user interfaces(s) 315 may be operatively coupled to host media device 200 using a standardized communication protocol, such as for example, Universal Serial Bus protocol (USB), Bluetooth Low Energy, ZigBee or a proprietary communications protocol, such as, for example, a proprietary infrared communications protocol. User interface(s) 315 may include a display configured to display the graphical users interfaces as described in reference to FIG. 5. For example, in the case where host media device 200 includes a television, the peripheral control device 300 in communication with a television may include a user interface including a touch-sensitive display presenting a graphical user interface. For example, a user may provide commands to host media device 200 by activating portions of a touch-sensitive display.

In an example implementation, context control application 330 can loads control functions (e.g., virtual keys, image icons, etc.) applicable or related to media application 240 of the host media device 200 that is active on the display 115. The user interface 315 of the peripheral control device 300 can present the user with textual information and channel information relevant to information active on the display 115 of the host media device 200. For example, the display 115 of the host media device 200 may have a Live TV application screen in TV has a contextual control functions, such as allowing user to select subtitle, volume control, settings such as video, audio language, subtitle language selection, etc.

The user interface 315 of the peripheral control device 300 can present a set of control functions (i.e., virtual keys) applicable for the screen or context the screen is currently functioning. For example, the user interface 315 of the peripheral control device 300 can present a set of keys for controlling a streaming application that corresponds to a streaming application executed by the STB and displayed on the main screen. When a search functionality of the application is presented on the main screen, the user interface 315 of the peripheral control device 300 can present a set of virtual keys that correspond to the search functionality or present a set of search results. Keys may be easily extended so without any additional cost to a new hardware remote control change. New features and direct key mapping may be displayed and controlled by application.

Encoder/Decoder 324 can be used with the one or more communication interfaces 305 to communicate with the host media device using one or more wireless protocols. In an implementation, communication interface is configured for Bluetooth® Low Energy (BLE) communication with the host media device. Encoder/Decoder 324 is used to communicate data associated with the context application 330 or other applications. The Generic Attribute Profile can be used to associate with an Attribute Protocol that establishes common operations and a framework for the data transported and stored by the Attribute Protocol. Encoder/Decoder 324 can send data transported over the Attribute Protocol and can accept Attribute Protocol requests, commands, and confirmations from a GATT server such as the host media device.

HID over GATT follows a defined protocol to maintain the universal compatibility. HID Specification defines three types of allowed data transfer where information is shared in units called reports. The input report format is used to transfer data from the PCD 300 to the host media device. The output report format is used to transfer data from the host media device to the PCD 300. In the feature report information travels from either host media device or PCD.

In some implementations, the peripheral control device 300 can transmit or receive additional data encoded as an HID report. Encoder/Decoder 324 can include functionality to transform the additional data into a format for transfer with as an HID report. The peripheral control device 300 can include a user interface 315 with a microphone for collecting voice commands. Encoder/Decoder 324 can encode the voice command into a compressed format and append header and trailer information to transmit the voice command as a HID input report.

In an implementation, the input report can be used for transfer voice samples from the PCD 300 to the host media device. For example, the voice samples can capture voice based commands—channel up, channel down etc. In another example, the method can be used for voice based search—movies by Dany Boyle etc. Input report packet size can be configured to a maximum size (e.g., 20 bytes) and include Bluetooth specific header data. Input voice samples can be encoded into adaptive differential pulse-code modulation (ADPCM). Adaptive differential pulse-code modulation is a variant of differential pulse-code modulation (DPCM) that varies the size of the quantization step, to allow further reduction of the required bandwidth for a given signal-to-noise ratio. Pulse-code modulation (PCM) is a method used to digitally represent sampled analog signals. In a PCM stream, the amplitude of the analog signal can be sampled regularly at uniform intervals, and each sample can be quantized to the nearest value within a range of digital steps.

In an implementation, a voice capture can be started by the PCD 300 using PCM samples that are collected. PCM samples can be encoded 324 to ADPCM samples. ADPCM can be used to reduce audio data from 16 bits to 4 bits. The compressed voice samples can be encoded 324 and transferred to the host media device 200 via HID input reports.

The host media device 200 can receive and buffer all the samples until voice capture is stopped. The decoder 224 of the host media device 200 decodes ADPCM to PCM samples for processing by the command handler. At the host media device 200, the input report starts with a notification and subsequent reports include an identifier fixed for the voice data collected. Once the collection of the voice samples is complete, the data processed to the decoder for the ADPCM format is decoded to PCM audio data for processing by the command handler of the host media device 200.

In another example, peripheral control device 300 can receive an output report encoded with image data. The Encoder/Decoder 324 can decode the output report and parse header and trailer information to extract the image data for use by the peripheral control device 300. As discussed in reference to FIGS. 4-7, the peripheral control device 300 can use the HID reports to transfer and receive payloads encoded with addition data, such as voice commands or image data.

FIG. 4 is a flow diagram of an example context management method 400 in accordance with one or more implementations of the present disclosure. In an example implementation, a method can be performed by processing logic that can comprise hardware (e.g., circuitry, dedicated logic, programmable logic, microcode, etc.), software (e.g., instructions run on a processing device), or a combination thereof. In an implementation, the method is performed by a context control application (e.g., context control 330 of FIG. 3) executed by a processing device of a PCD (e.g., CPU 310 of FIG. 3). The PCD can be in communication with a host media device and an associated display (e.g., projector, TV, etc.). The processing device can support multiple contexts that coordinate one or more sets of control options available via the PCD with the activities or context of the host media device.

At block 410, the processing device presents a set of control functions via an interface of a peripheral control device. The control function includes a command associated with one or more media contexts of a host media device. In some implementations, the processing device includes a touchscreen interface and presents a set of virtual buttons, images, or icons representing the control functions.

The control functions present on the interface of the PCD may become inoperable with a primary media context active on the host media device. A media context can be associated with a media service such as a search service, television media service, streaming media service, on-demand media service, local media service, etc. The primary media context is the media service presented on a main display by the host media device.

The set of control functions presented on an interface of the PCD are commonly not associated with the primary media context active on the main display by the host media device causing user confusion. For example, when the main display by the host media device is activated after a period of inactivity, the interface of the PCD may have been knocked around or inadvertently changed, and thus the control functions present on the interface of the PCD do not correspond to the control options relevant to the primary media context. In some cases, there are multiple means to change the primary media context active on the main display and the control options on the interface of the PCD becomes out of date. For example, the host media device may experience a power failure and reset to a different context, a user may use a physical interface on the host media device to change the primary context, or the host media device may pre-programmed or scheduled to change the primary media context active on the main display to name a few.

At block 420, the processing device decodes a payload from the host media device with an encoded context identifier. The context identifier indicates the primary media context active on the host media device. In an implementation, the host media device can send the payload with context identifier in response to a request by the processing device to change the context of the primary media context active on the host media device. The request by the processing device can include the context identifier and the host media device can load a primary media context associated with the context identifier on a main display of the host media device. The host media device can send the payload with the context identifier in response to successfully launching primary media context as a confirmation that the original request by the processing device is complete.

In some implementations, the processing device receives the payload with a context identifier based on a timed interval to maintain context coordination between the host media device and PCD. For example, a payload can be delivered every 30 seconds or more frequently based on a frequency of interaction between the processing device and host media device.

In some implementations, the host media device sends the payload with context identifier as part of an error response. For example, the host media device may send a payload with a context identifier in response to receiving a first control function associated with a first context identifier and determine that the first control function is not associated with the primary media context active on the host media device. In this example, the processing device receives the payload in response to sending a previous command that does no do not match the context of active on the host media device.

In an implementation, the processing device communicates with the host media device via protocol, such as Bluetooth Low Energy or ZigBee and the context identifier is received as an encoded value in an HID reports. The processing device decoding the payload to determine the context identifier can include, for example, parsing header and trailer information.

At block 430, the processing device determines one or more control functions corresponding to the context identifier. In an implementation, processing device can include an index indicating the control functions associated with a context identifier. For example, the PCD can have a stored index of control functions with associated context identifiers. In an implementation, processing device can request an index indicating the control functions associated with a context identifier. For example, the processing device can request an index from the host media device or a media application associated with context identifier.

The processing can search memory based on the control identifier and the index to access locally stored control functions available in memory of the PCD. The processing device can load the determined control function from the memory and present the control function via the interface. For example, the processing device can determine the context identifier is associated with a set of playback control functions and present a set of playback icons on the interface. In an implementation, processing device can determine one or more control functions associated with the context identifier are unavailable in memory of the PCD and access remotely stored control functions. For example, the processing device can access a cloud service to download the one or more control functions associated with the context identifier.

At block 440, the processing device changes the set of control functions on the interface of the PCD to include the one or more control functions that can command the primary media context. For example, the processing device can update the touchscreen interface to add or remove virtual buttons, images, or icons. The processing device in communication with the host media device actively updates the interface of the PCD to present the user with control options that are relevant to the context of the host media device.

FIGS. 5A-B illustrates example interfaces 500 of a peripheral control device in accordance with one or more implementations of the present disclosure. User interface 500 can be a display of a programmable peripheral control device 500 (e.g., peripheral control device 300 of FIG. 3). The functionality of user interface 500 may be implemented using different types of interfaces. In some examples, user interface 500 may include a microphone and/or motion sensors and may be configured to receive voice and motion input. For example, in the case where a user interface 500 includes a touchscreen, gesture recognition, and/or voice recognition, virtual buttons may be presented on the touchscreen and functions achieved by activation of buttons on user interface 500 may be achieved through any and all combinations of virtual button activation, motion gestures, and/or voice commands. As illustrated in FIG. 5A, user interface 500 of the peripheral control device 500 can includes touchscreen displays.

Touchscreen user interface 500 may include any display device configured to display graphics and receive a user touch input. For example, touchscreen display interfaces 500 may include an LCD display, an OLED display, or any other type of display device capable of presenting visual data to a user, and a capacitive touch sensor device, a resistive touch sensor device, or any other type of device capable of receiving user touch events. The touchscreen interface 500 can be configured to receive user touch events directly or indirectly (e.g., using a stylus). Touchscreen user interface 500 may be configured to display icons representing items of content. Touchscreen user interface 500 can receive various user touch inputs, such as, a signal tap, a double-tap, a press of a specified duration (e.g., a long press), a multi-point touch input (e.g., a pinch gesture), and complex touch gestures (e.g., drag and drop gesture, character writing gestures, and swiping gestures). Further, in some examples, touchscreen user interface 500 may be pressure sensitive and cause different types of activations to occur based on the amount of pressure a user applies to touchscreen user interface 500 (i.e., how "hard" a user presses).

Touchscreen user interface 500 may be configured to enable a user to perform multiple types of activations with respect to regions 502-505 of touchscreen user interface 500, where a region 502 may present one or more graphics (e.g., an icon) to activate a control function. User interface 500 may include designated regions 502-505 that can be used to group sets of control options.

In the example illustrated in FIG. 5A, touchscreen user interface 500 displays virtual buttons and a graphical user interface within respective regions 502-505. Virtual buttons may replicate push-buttons, including, for example, one or more of the buttons for a control operation. A user may activate a virtual button by activating a corresponding area on touchscreen user interface 500. In some instances virtual buttons may be referred to as soft keys. In some implementations, user interface 500 may include a regions 502-503 presenting short-cut icon configured to facilitate functionality with respect to a particular application, media service, graphical user interface, or particular item of digital content currently running on a host media device.

A context control application running on the peripheral control device may be configured to receive data (e.g., a context identifier) from the host media device and determine one or more sets of control functions to present on the display 500. The context identifier may be associated with a set of control functions for controlling an application currently running on the host media device. In an implementation, the peripheral control device 500 can present a first set of control functions (e.g., play back controls) in a first region 503 of the display. A sub-context identifier may be associated with an additional set of control functions for controlling a particular aspect of an application running on a host media device. Application specific icons and control functions may be based on a context and/or a sub-context. In an implementation, the peripheral control device 500 can present a second set of control functions (e.g., short-cuts) in another region 505 of the display.

In the examples illustrated in FIG. 5B, different groups of control functions can be displayed as relevant short-cuts, text, icon or combination in one of the regions 502-505 and includes application specific control options mapped to control functions of a media application. The peripheral control device includes context control software to match the set of control functions displayed 500 to a context of the media application running on the host media device. In an implementation, the user interface 500 displays control functions as short-cut icons to provide the user with increased flexibility efficiency to control the host media device.

In the examples illustrated in FIG. 5B, context specific control options 510, 520, 530, 550, 560 can include virtual buttons as icons that are associated with control functions relevant to an active media service on the host media device. For example, in response to the peripheral control device receiving a context identifier associated with a traditional television service, a numeric television context group 510 may present virtual buttons in region 503 that replicate a numeric keypad 511, an enter button 512, a previous channel button buttons 513, and volume control buttons 515.

In some examples region 502-505 may change to match a different context used to perform other functions associated with a different media service. Devices with digital media playback capabilities, including, for example, televisions, set top boxes, and mobile devices, may be configured to provide users thereof with graphical user interfaces that enable the selection of content. Context specific control options may be customized for a specific application or include general options that can be mapped for specific applications. For example a computer context specific control option 540 may include icons to cause the host media device to launch a particular computer application on the main display, such as weather application, task list, sports scores, etc.

Context specific control options can be represented by icons associated with television network logos that, upon activation (e.g., a tap activation, a click activation, etc.), may cause a tuner of the host media device to tune to the particular television channel (or cause the host media device to access a particular media stream). In the case where application specific options are associated with television channels, television channels may correspond to recently viewed channels and/or a set of channels determined by information included in a user's profile. Further, in one example, television channels represented by icons associated with context specific control options may mirror channels displayed on a graphical user interface.

For example, a main display (e.g., display 115 of FIG. 1) may include channels AMC, FOX, NBC, CBS, BBC, Showtime, and HBO of the host media device 110 as part of a graphical user interface. In this case, application specific icons may include icons representing AMC, FOX, NBC, CBS, BBC, Showtime, and HBO. In a similar manner, when a graphical user interface associated with an on demand content application is presented on a display, specific icons may represent icons corresponding items of content. For example, context specific options may represent the movies when the display 115 presents a movie. In this manner, user interface 503 is configured to dynamically present icons which may be activated by a user and receive user input, including multi-level activations.

Based on received user inputs provided to a peripheral control device, the host media device may cause changes to occur with respect to an item of content and/or graphical user interfaces presented on the main display and/or the user interface 500 of the peripheral control device. In some examples, context specific control options 510, 520, 530, 550, 560 may be presented to a user in response to a user selection. For example, a user can selected a control function to activate a particular media stream (e.g., menu 534) and the peripheral control device can display a sub-context group of specific control options (e.g., streaming menu options 560) in another region 505 independent of the host media device.

In other examples user interface 500 may display motion based graphics, animations, video, and the like and may enable complex user interactions (e.g., so-called second screen applications). For example, user interfaces 500 may enable a user to play a game (e.g., a trivia game or a video game) or keyboard displayed in regions 502-505. Further, user interface 500 may display information associated with an item of content rendered on a display associated with a computing device (e.g., a plot synopsis of a movie). For example, a user selection of an info button 533 can cause supplemental information to appear in another region 504.

The user interface 500 may also present control functions as a graphics, icons, or text representing an item of content. In an example, graphical user interface can includes a voice activated searching graphical user interface. For example, upon a user saying the name of an actress and graphical user interface 500 may display a list of movies associated with the actress.

In an implementation, the interface includes a microphone, and the PCD receives voice data via the interface, compresses the voice data into an Adaptive Differential Pulse Code Modulation format; and transmits the compressed voice data to the host media device to command the primary media context.

In an example media context, the region 503 might present playback controls 520 configured to enable a user to control the playback of and/or record multimedia content. For example, the region 503 matching a playback context may enable a user to control the playback of a video originating from a media service provider site, an on demand engine, and/or a personal video recorder (PVR). The region 502 matching a playback context may include reverse playback button 521, normal playback button 522, forward playback button 523, stop playback button 524, pause playback button 525, and record button 526. Reverse playback button 521 may enable to a user to navigate to a previous point in a multimedia sequence.

Upon activation, normal playback button 522 may cause the host media device to present normal playback of an item of multimedia content to begin or resume on the main display. Forward playback button 523 may enable a user to navigate to a future point in a multimedia sequence. Record button 526 may enable a user to cause an item of multimedia content to be stored to a storage device. In one example, record button 526 may enable a user to record content to a storage device.

Other context specific control options, e.g. 530, may include default control options or be associated with multiple media services. For example, a navigational region 504 may be configured to present navigation control options 530 with virtual navigational buttons as a default set of control functions, such as arrow buttons 531, select button 532, information button 533, menu button 534, guide button 535, back button 536, and exit button 537. Navigational arrow buttons 531 may be configured to move the position of a cursor associated with a graphical user interface and/or change the selection of an item included in a graphical user interface. Select button 532 may enable a user to further select an icon. In one example, consecutive activations of select button 532 may cause respective levels of selection to occur. Information button 533 may be configured to cause additional information associated with an item of content of to be displayed. For example, when an icon representing an item of content is initially selected, activation of information button 533 may cause information associated with the content (e.g., cast and crew information) to be displayed. Menu button 534, guide button 535, back button 536, and exit button 537 may be configured to enable a user to cause different graphical user interfaces to be presented. Upon activation, menu button 534 may cause a graphical user interface including a high level menu to be displayed. In one example, a high level menu may include a menu that enables a user to change settings associated with the operation of a computing device. In one example, a high-level menu may include a menu that enables a user to select a user profile (e.g., a log-in graphical user interface). Upon activation, guide button 535 may be configured to provide a graphical user interface that enables a user to select content. In one example, upon activation of guide button 535, a graphical user interface including a grid guide may be presented to a user. Back button 536 may be configured to enable a user to return to a previous graphical user interface. Exit button 537 may be configured to enable a user to return to a full screen viewing mode. For example, when a graphical user interface is displayed, upon activation of exit button 537, the graphical user interface may "disappear" and a full screen content viewing mode may be presented to a user.

FIG. 6 is a flow diagram of an example context management method 600 in accordance with one or more implementations of the present disclosure. In an example implementation, a method can be performed by processing logic that can comprise hardware (e.g., circuitry, dedicated logic, programmable logic, microcode, etc.), software (e.g., instructions run on a processing device), or a combination thereof. In an implementation, the method is performed by at least a context handler application (e.g., command handler 235, context handler 230, and/or Encoder/Decoder 224, of FIG. 2) executed by a processing device of a host media device (e.g., CPU 210 of FIG. 2). The host media device can be associated with a main display (e.g., projector, TV, etc.) and in communication with a peripheral control device. The processing device can support multiple contexts that coordinate one or more sets of control options available via the PCD with the activities or context of the host media device.

At block 610, the processing device determines one or more commands for controlling an active media context of the host media device. The host media device can support several media services such as a search service, television media service, streaming media service, on-demand media service, local media service, etc. that outputs a media context of the media service onto the main display. For example, the media context can be a specific be an item of content, a menu, or other graphical interface of the media service. The active media context is the media context being presented on a main display by the host media device. The host media device can handle multiple commands for switching between media services or contexts of media services. Each media service can have application specific commands as well as context specific commands to allow for user interaction.

At block 620, the processing device encodes a payload with a context identifier corresponding to the one or more commands. The context identifier is used by the PCD to identify control functions that corresponds to the one or more commands that for controlling the active media context.

At block 630, the processing device transmits the encoded payload to the PCD. In an implementation, the processing device communicates with the PCD via a protocol, such as Bluetooth Low Energy or ZigBee and the context identifier is encoded as an HID reports. The processing device encodes the payload, for example, by packing the control identifier with header and trailer information according to the protocol.

At block 640, the processing device determines whether the PCD includes one or more control functions associated with the context identifier. At block 650, the processing device causes the PCD to present one or more control functions corresponding to the one or more determined commands of the active media context. For example, if the processing device loads a media service that allows the user to enter alphanumeric input, the processing device determines the PCD includes a virtual keyboard for entering alphanumeric input and can instruct the PCD to associate the alphanumeric input with the context identifier.

If the PCD does not have the control functions stored locally, the processing device can send the PCD a new set of control functions for use with the active media context. In an implementation, the processing device can send a payload that includes an image encoded in as a HID output report. The PCD can present the image as a control functions corresponding to the one or more determined commands of the active media context. For example, if the processing device loads an active media service with recently added channels, the processing device can send the PCD a set of images associated with the added channel logos and a set of instruction to transmit the channel identifier to the processing device. Then the PCD can display the images as shortcuts for display by the PCD to the user. In response to receiving the channel identifier from the PCD, the processing device can tune the main display to the channel.

Figure 7:
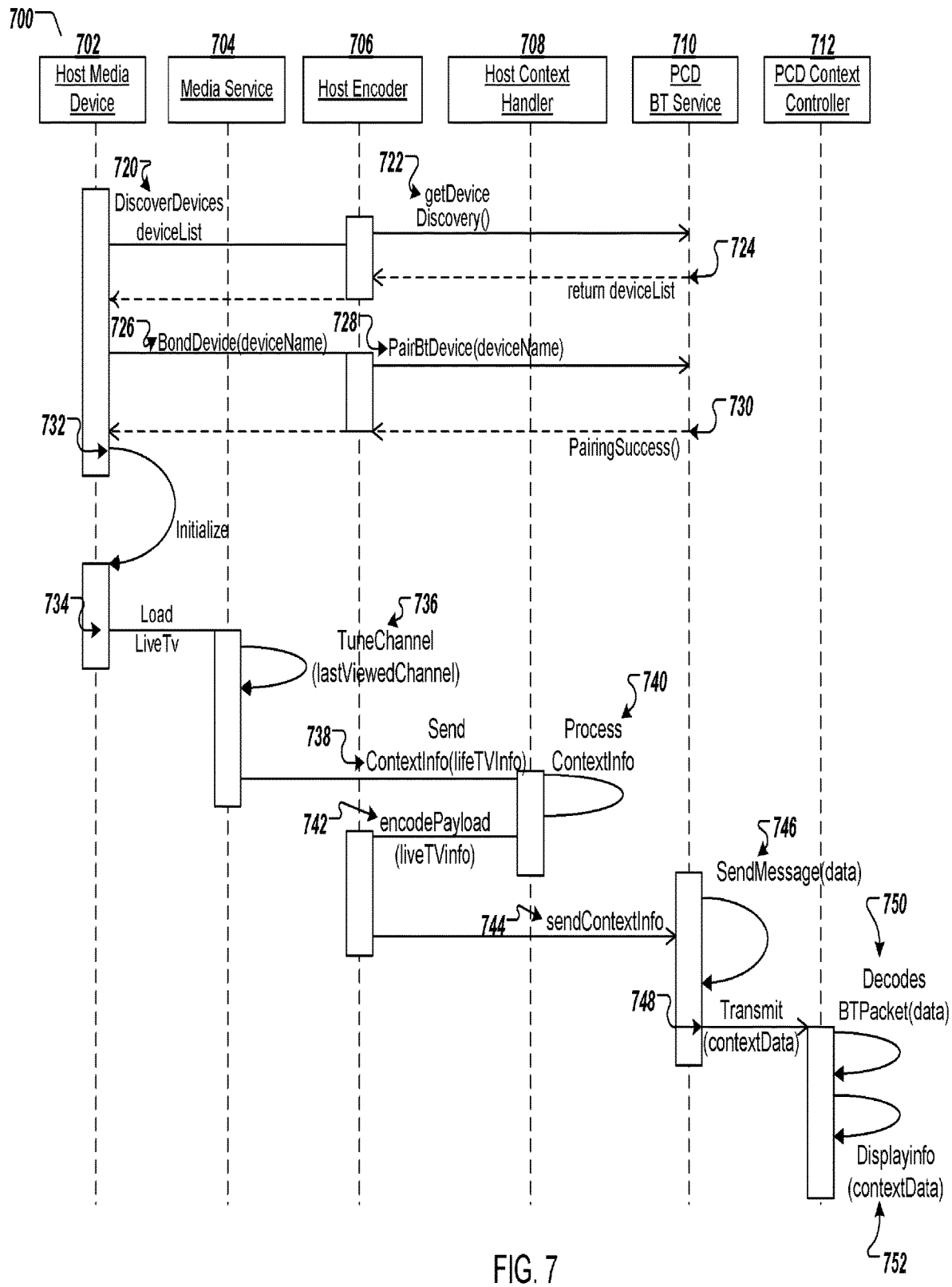
FIG. 7 illustrates an example context management sequence in accordance with one or more implementations of the present disclosure.

FIG. 7 illustrates an example context management sequence 700 in accordance with one or more implementations of the present disclosure. In an implementation, the peripheral control device may communicate over IP (Ethernet/Wifi/ZigBee) or by using Bluetooth Low Energy. A user may boot up a host media device, e.g., a STB, and the host media device then discovers the peripheral control device and pairs with the remote control unit. Steps 720-730 illustrate a Bluetooth discovery and paring sequence between the host media device with the peripheral device controller 712. For example, at 720, the host media device performs a DiscoverDevices function using the host encoder 706 (e.g., Bluetooth) and PCD Bluetooth Service 710 to getDeviceDiscovery( ).

The host media device 702 can provide services for a scan client role with a scan parameters profile. For example, a PCD can have one or more instances of HID Services, one or more instances of a battery service, a device information service, scan parameters service, etc. The PCD may include single or multiple instances of other services. In this example, the host media device 702 has upper layers of the Bluetooth software running on its native processor and is connected to a Bluetooth radio module via a transport bus such as USB. The PCD in this example has its firmware encoded with the radio firmware, running on the same CPU, for the lowest possible cost implementation. Other implementations on the HID side are possible and equally valid.

The Bluetooth Service 710 returns a list of discovered device at 724. The host media device 702 can select peripheral control device name from the device list and send a request to bond the devices at 726 via the host encoder 706 that include a protocol driver for communicating with the PCD (e.g., Bluetooth, Zigbee, other HID protocol) to PairBtDevice(deviceName) at 728. The PCD Bluetooth Service 710 authorizing the request will return a message to the host media device to confirm a PairingSuccess( ) at 730.

The host media device 702 can execute host context handler 708 and the PCD can execute PCD context controller 712 to facilitate the context management that coordinate possible control commands of an active media service 704 on the host media device 702 with control options presented to the user by the PCD. That is, the context management sequence 700 is to indicate to the PCD the control options that are relevant to the media service 704 that is active on the host media device so that the PCD can present the relevant control options to the user.

In an example scenario, the host media device 702 can boot-up or initialize at 732 and activate a media service 704, for example, load a LiveTV 734 service. Since the active context of the host media device 702 or the presented control options on the PCD may have changed since the last time the two device were used together, the context management software can change the control options presented by the PCD to be relevant to the media application 702. For example, the media service 704 may load to the last state TuneChannel(lastViewedChannel) at 736. The host context controller 708 can determine the active context vie receiving sendContextinfo(liveTVinfo) at 738.

At 740, the host context handler 708 can determine the commands associated with the active context of the media service 704 by processing context information. To ensure reliable and low cost coordination with the PCD, the HID over GATT protocol can be used to encode a Payload with the context information (LiveTVinfo) at 742. The middleware encodes contextual packets and sends it to the Bluetooth driver over an extended Bluetooth protocol. The PCD can receive a message from the driver and unpacks the details in the PCD application. The PCD application can decode the payload and load the application context keys and information related to the context. For example, the host encoder 706 on the host media device 702 can encode the context information into an HID output and send the context information 744 to the Bluetooth service 710 of the PCD. The Bluetooth service 710 can receive the encoded message data 746 and decode the message back into context data 748 that can be send to the PCD context controller 712. The PCD context controller 712 determines the control options associated with the decoded packets at 750 and displays the relevant control options to the user at 752.

Figure 8:
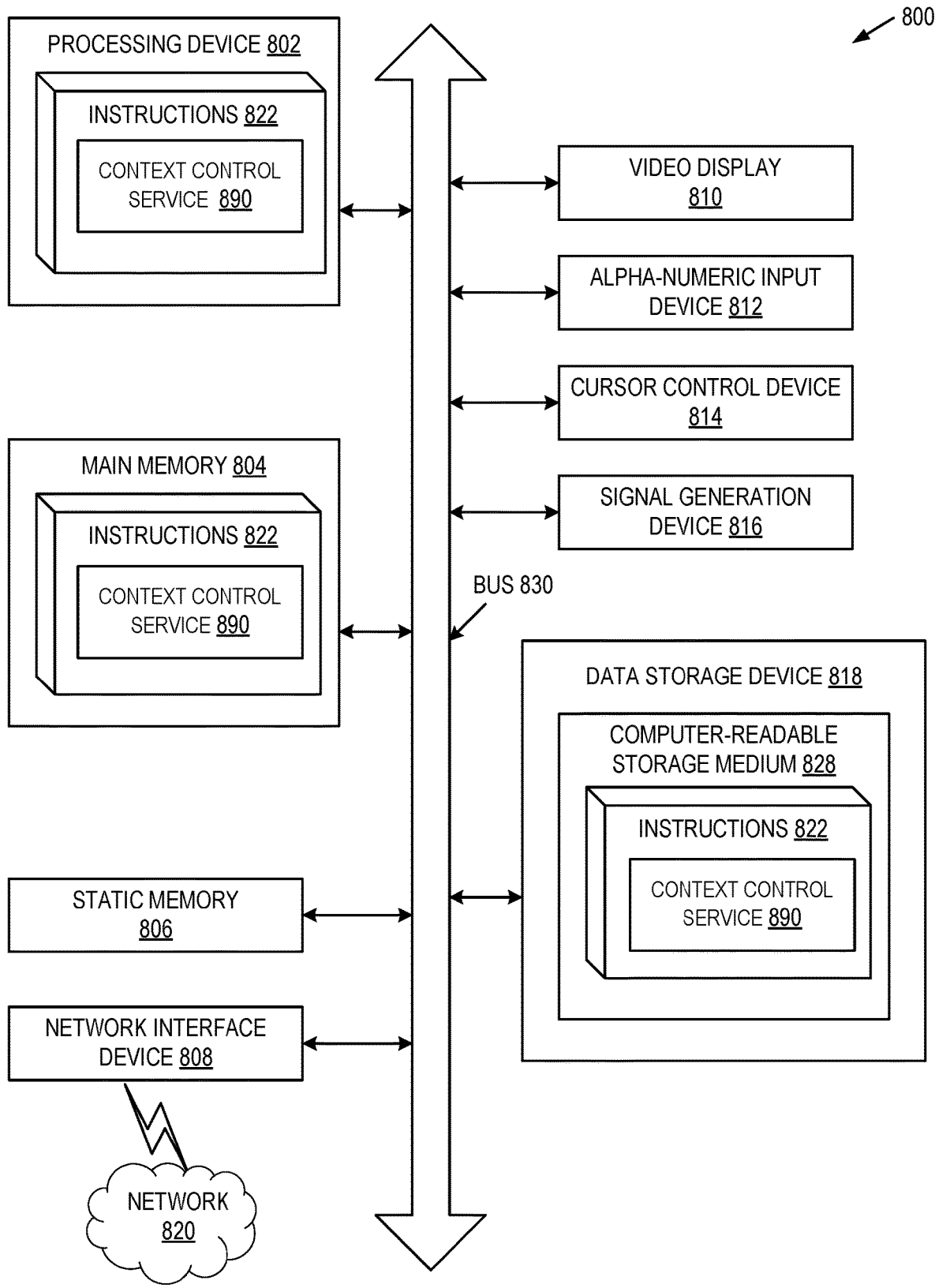
FIG. 8 illustrates a block diagram of one implementation of a computing device.

FIG. 8 illustrates a block diagram of one implementation of a computing device 800 within which a set of instructions, for causing the machine to perform any one or more of the methodologies discussed herein, may be executed. In alternative implementations, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a non-transitory computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store a context control service engine 890 (as described with reference to FIGS. 1-7), and/or a software library containing methods that call an context control service engine 890. While the computer-readable storage medium 828 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

In an implementation, the modules, components and other features described herein (for example context control service engine in relation to FIGS. 3-7) can be implemented as discrete hardware components or integrated in the functionality of hardware components such as ASICS, FPGAs, DSPs or similar devices as part of a peripheral control device (e.g., peripheral control device 150 of FIG. 1). In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "presenting", "changing", "downloading", "determining", "encoding", "decoding", "causing", "receiving," "identifying," "transmitting" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Implementations of the present disclosure also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method for modifying functionality of one or more devices, the method comprising:
    obtaining, at a control device, first data over a network, the first data identifying first content active at a media device;
    identifying, at the control device, one or more first control functions associated with the first content;
    transmitting from the control device over the network, a notification that at least one of the one or more first control functions associated with the first content is unavailable in memory of the control device;
    receiving over the network, the at least one of the one or more unavailable first control functions; and
    updating a first portion of a graphical interface of a display on the control device to include one or more elements representing the received at least one of the one or more unavailable first control functions and one or more images associated with the one or more unavailable first control functions.

2. The method of claim 1, further comprising:
    determining a second control function associated with second content is unavailable in memory of the control device;
    downloading the second control function; and
    changing the first portion of the graphical interface to include one or more elements representing the downloaded second control function.

3. The method of claim 1, wherein the one or more images are indicative of television network logos and wherein the one or more first control functions comprise functionality to send a channel change command corresponding to the one or more images.

4. The method of claim 1, wherein the one or more images are indicative of computer applications, and wherein the one or more first control functions comprise functionality to send a command to execute the computer applications.

5. The method of claim 1, wherein the first content active on the media device is a last state active on the media device when the control device was paired with the media device.

6. The method of claim 5, wherein the media device loads to the last active state in response to being paired with the control device.

7. The method of claim 1, further comprising:
providing a device list, in response to a query;
receiving a request to bond; and
providing a pairing success.

8. A non-transitory computer readable medium storing instructions for modifying functionality of one or more devices, the instructions comprising:
obtaining, at a control device, first data over a network, the first data identifying first content active at a media device;
identifying, at the control device, one or more first control functions associated with the first content;
transmitting from the control device over the network, a notification that at least one of the one or more first control functions associated with the first content is unavailable in memory of the control device;
receiving over the network, the at least one of the one or more unavailable first control functions; and
updating a first portion of a graphical interface of a display on the control device to include one or more elements representing the received at least one of the one or more unavailable first control functions and one or more images associated with the one or more unavailable first control functions.

9. The non-transitory computer readable medium of claim 8, further comprising:
determining a second control function associated with the first content is unavailable in memory of the control device;
downloading the second control function; and
changing the first portion of the graphical interface to include one or more elements representing the downloaded second control function.

10. The non-transitory computer readable medium of claim 8, wherein the control device is a remote control device and the media device is a set top box.

11. The non-transitory computer readable medium of claim 8, wherein the one or more images are indicative of television network logos and wherein the one or more first control functions comprise functionality to send a channel change command corresponding to the one or more images.

12. The non-transitory computer readable medium of claim 8, wherein the one or more images are indicative of computer applications, and wherein the one or more first control functions comprise functionality to send a command to execute the computer applications.

13. A system for modifying functionality of one or more devices, the system comprising:
a processor configured to:
obtain, at a control device, first data over a network, the first data identifying first content active at a media device;
identify, at the control device, one or more first control functions associated with the first content;
transmit from the control device over the network, a notification that at least one of the one or more first control functions associated with the first content is unavailable in memory of the control device;
receive over the network, the at least one of the one or more unavailable first control functions; and
update a first portion of a graphical interface of a display on the control device to include one or more elements representing the received at least one of the one or more first control functions and one or more images associated with the one or more unavailable first control function.

14. The system of claim 13, wherein the processor is configured to identify one or more second control functions by:
determining a second control function associated with second content are unavailable in memory of the control device;
downloading the second control function; and
changing the first portion of the graphical interface to include one or more elements representing the downloaded second control function.

15. The system of claim 13, wherein the control device is a remote control device and the media device is a set top box.

16. The system of claim 13, wherein the one or more images are indicative of television network logos and wherein the one or more first control functions comprise functionality to send a channel change command corresponding to the one or more images.

17. The system of claim 13, wherein the one or more images are indicative of computer applications, and wherein the one or more first control functions comprise functionality to send a command to execute the computer applications.

18. The system of claim 13, wherein the processor is further configured to:
in response to receiving voice data to control the media device via an interface of the control device, compress the received voice data into a plurality of voice samples;
generate at least one payload comprising a compressed voice sample from the plurality of voice samples; and
transmit the at least one payload to the media device, wherein the media device buffers the at least one payload and determines one or more second control functions corresponding to the voice data.

19. The system of claim 18, wherein the at least one payload is encoded in a Human Interface Device input report with header and trailer information appended to the compressed voice sample.

20. The system of claim 13, wherein the first content is associated with a search service, a television media service, a streaming media service, an on-demand media service or a local media service.

* * * * *